April 29, 1958   M. VIGER ET AL   2,832,254
NUT AND EXPANDING SLEEVE RETAINER THEREFOR
Filed Sept. 21, 1954
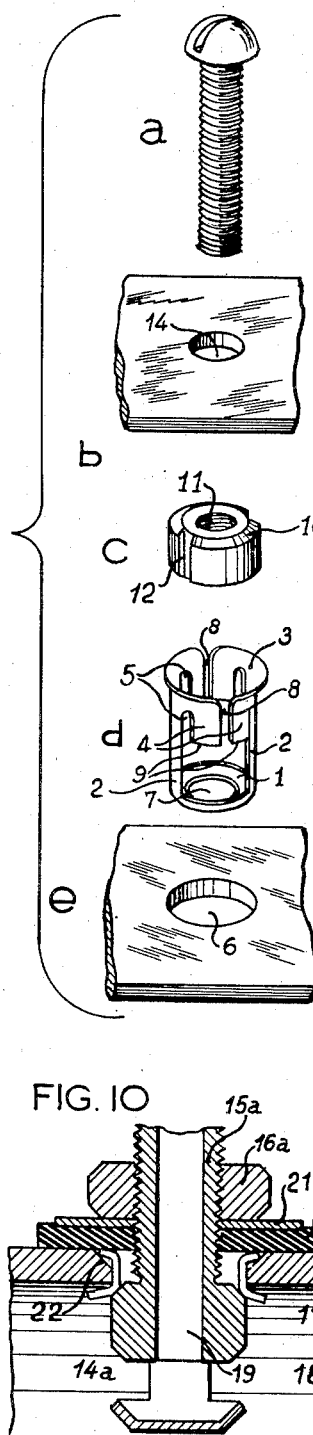
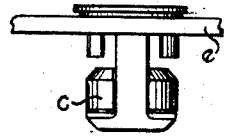
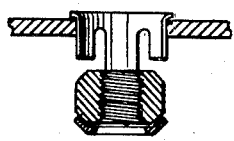
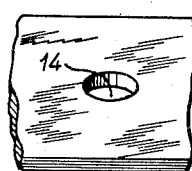
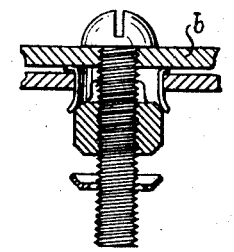
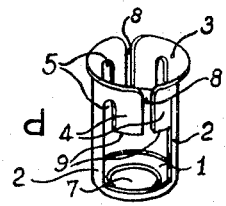
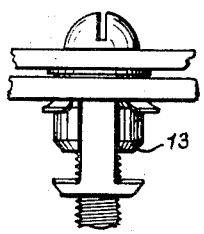
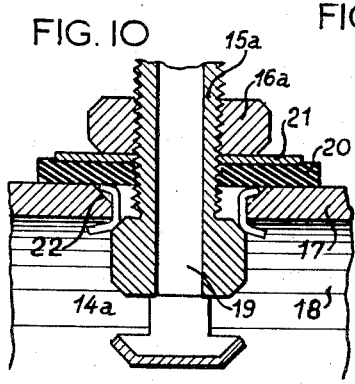
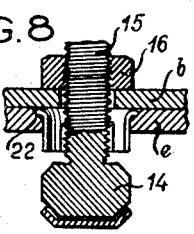
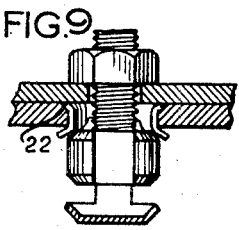
Inventors
M. Viger
A. L. Varon
By Gleason & Downing Teeboy
Attys.

United States Patent Office 2,832,254
Patented Apr. 29, 1958

2,832,254

NUT AND EXPANDING SLEEVE RETAINER THEREFOR

Maximilien Viger, Crosnes, and André Louis Varon, Paris, France, assignors to Aerocessoires Simmonds, Levallois-Perret (Seine), France, a company of France Application September 21, 1954, Serial No. 457,446

Claims priority, application France September 28, 1953

6 Claims. (Cl. 85—2.4)

This invention relates to assemblies, including a screw threaded member such as a nut, a bolt or the like and a retaining member therefor, provided for attachment to a thin wall of which only the outer face is accessible, of the type comprising a retaining member wherein the screw threaded member is housed, the whole assembly being adapted to be inserted through an aperture of said wall to bring the screw threaded member on the inaccessible inner side, whereupon if said screw threaded member is engaged with another one, adapted to cooperate therewith for screwing action, a portion of the assembly located behind the wall is so deformed that said wall becomes clamped between the rear portion of the assembly and its front portion provided, to this effect, with a flange, or the like, adapted to bear on the front edge of the mounting hole (in the present specification, as well as in the appended claims, the expressions "front portion" and "rear portion" designate respectively the portions of the assembly which are located on the outer accessible side and on the inner inaccessible side of the assembly. Moreover, the expression "threaded member" will be used indifferently to designate a nut or the head of a bolt, the threaded shank of which is intended to receive a nut).

Such assemblies are useful to affix supplemental parts, such as embellishing appliances to already finished structures, of which dismantling would be unduly expensive or even impossible.

An object of the invention is to provide an assembly of the type described, offering a generally cylindrical shape and adapted to be inserted in an ordinary round hole, that can be drilled in the mounting wall without using any special tool, the said assembly being however so designed that even before being deformed, it does not turn in said hole as the bolt is screwed in the nut (or conversely).

Another object of the invention is to provide such an assembly in which the retaining member is diametrically slit along its whole length, so that the mounting hole may be drilled with a diameter slightly larger than the general outer diameter of the assembly, the clearance being then easily taken-up by slightly opening the slot of the retaining member. This arrangement offers the further advantage of facilitating the introduction, in the retaining member, of the threaded member to be housed therein. Moreover, this arrangement is naturally obtained if the retaining member is cut-out in a metal sheet as described hereunder. Still another advantage of this arrangement is that a slight clearance between the hole and the assembly permits driving the latter home by hand.

A further object of the invention is to provide an assembly of the above described type of which the threaded member is cylindrical and provided with two diametrically opposed peripheric longitudinal grooves and wherein, along a part of its rear portion, materially longer than the said threaded member, the retaining member is completely cut-out except for two diametrically opposed longitudinal bracing strips adapted to be engaged with a free fit in said nut grooves, whereby, while being keyed in rotation with the retaining member, the said threaded member is freely slidable axially therein along the said part of the rear portion of the retaining member, so that the mere axial stress exerted by the operator when screwing both threaded members together, suffices to create between the front portion of the retaining member and the outer face of the wall, a friction capable of preventing any rotation of the retained threaded member, so that no special tool or additional retaining means are required for holding the said threaded member against rotation.

Still another object of the invention is to ensure locking of the retaining member on the outer face of the wall by means of a flange merely constituted by a flared outer portion of the retaining member itself. This has the advantage of reducing the thickness of this external flange to a minimum. It is even possible to suppress any projection of the assembly with respect to the outer face of the wall by countersinking the flange in a shallow chamfer of the outer edge of the mounting hole.

Another object of the invention is to provide the deformable portion of the retaining member in the shape of simple lugs obtained by further slitting the retaining member along a plurality of generatrices, the front edge of the threaded member housed in the retaining member being chamfered so as to form a wedge which is forced between the lugs to flare the same out as the said threaded member is driven axially towards the wall under the screwing action of the conjugated threaded member.

Another object of the invention is to further chamfer the other edge of the retained threaded member symmetrically with the first one, said second chamfer cooperating with a conical bottom of the retaining member, whereby the said threaded member is automatically centered as the conjugated threaded member is engaged thereinto. This arrangement further offers the advantage that the threaded member to be retained can be introduced with either side ahead into the retaining member, which permits using for this purpose automatic drop devices.

The assembly according to the invention offers, in addition to the already mentioned advantages and to those directly resulting from the above described features, that of being well adapted to an entirely automatic manufacturing process comprising exclusively extremely simple cutting and folding operations.

The invention will be better understood with reference to the following detailed description, together with the appended drawings submitted for purpose of illustration only and not intended to define the scope of the invention.

In the drawings:

Fig. 1 is an exploded view of a nut-and-retainer assembly according to the invention, said view also showing a portion of a plate on which the said assembly is to be mounted, a portion of a part to be affixed on said plate and a bolt to cooperate with said nut for this purpose.

Fig. 2 is an elevational view of the assembly mounted in a hole on a plate.

Fig. 3 is an axial sectional view of Fig. 2.

Fig. 4 shows the same assembly after engagement of the bolt in the nut during a first phase of deformation of the retaining lugs.

Fig. 5 is an axial sectional view of Fig. 4.

Fig. 6 is a view corresponding to Fig. 4, but showing complete deformation of the retaining lugs, the bolt being screwed home in the nut.

Fig. 7 is an axial sectional view of Fig. 6.

Fig. 8 is an axial sectional view of another embodiment, in which the head of a bolt is housed in the retaining member of the assembly.

Fig. 9 is a partly sectional, partly elevational view of the embodiment of Fig. 8 after home screwing of a nut of the bolt.

Fig. 10 is an axial sectional view of a modification of the embodiment of Figs. 8 and 9, wherein the bolt is provided with an axial bore to communicate both sides of the mounting wall.

As more clearly shown in Fig. 1, the retaining member of the assembly according to the invention is made of one piece of thin metal, so cut-off in a metal sheet and so folded as to offer the shape of generally cylindrical tubular cage comprising a bottom 1, annular in the embodiment shown in Figs. 1 to 7 for accommodating a bolt such as a, through its central circular aperture 7. The said bottom 1 is interconnected through two diametrically opposed bracing strips 2 with two terminal portions 3 flared out, as shown, to ensure abutment of the retaining member on the outer edge of the mounting hole 6 shown in Fig. 1 at e. A plurality of lugs 4 (two in the example shown) are formed in each terminal portion 3 between slots such as 5 extending along generatrices of the cylindrical member and including the diametrically opposed longitudinal gaps 8 separating the terminal portions 3 from each other. These lugs 4 constitute the deformable portion of the retaining member. They are limited at their free end by circular edges 9, the inner limiting line up on which will act, as explained hereunder, a chamfer 10 of the threaded member of the assembly. In the example shown in Figs. 1 to 7, the said threaded member is constituted by a cylindrical nut, the inner threading 11 of which is shown in Fig. 1 at c. The said nut is furthermore provided with two diametrically opposed peripheral longitudinal grooves 12 adapted to receive the longitudinal strips 2, so as to ensure axial guiding with a free fit of the said nut along said strips. The outer diameter of the nut c is comprised between the inner and outer diameters of the longitudinal strips 2 so that the nut does not project out of its retaining member, while being however safely locked on the strips 2. Furthermore, the diameter of the nut should be chosen sufficiently greater than the inner diameter of the retaining member to ensure safe engagement between the chamfer 10 and the edges 9 of the lug. To ensure a free sliding fit, the diameter of the bottom of the grooves 12 is slightly smaller than the inner diameter of the strips 2. Moreover the axial distance between the free ends 9 of the lugs 4 and the bottom 1 of the retaining member d is materially greater than the axial size of the nut c, to permit a certain freedom of axial displacement of said nut in said retaining member.

In the example shown, a second chamfer 13 (see Figs. 4 and 6) similar to and symmetrical with the above mentioned chamfer 10 is provided on the opposed edge of the nut c and the annular bottom 1 has been given a frusto-conical shape, as more clearly shown in Figs. 2 to 7. This second chamfer 13 has for its purpose to ensure centering of the nut c as the same is pressed upon the bottom 1 under the axial stress exerted by the operator for engaging the bolt a into the said nut. It will be easily understood that said centering considerably facilitates screwing engagement between the threads of the bolt and nut.

To complete the assembly according to the invention, it suffices to introduce the threaded member to be retained such as nut c of Fig. 1 into the retaining member d. For this purpose, it suffices to take the terminal flared out portions 3 slightly apart and to drop the said threaded member axially thereinto. In the example shown, thanks to the presence of the above second chamfer 13, the nut c may be dropped axially into the retaining member d with either face ahead, which permits effecting this operation automatically e. g. by means of electro-magnetic dropping devices.

Once the threaded member is dropped into place, the longitudinal grooves 12 are engaged on the strips 2 and the terminal portions 3 are brought into their original relative position again.

When an additional part such as the plate b of Fig. 1 is to be secured on a wall such as e of which only the outer side (the upper side, as shown in the drawings) is accessible it suffices to drill a round hole such as 6 in the said wall e with a diameter approximately equal and slightly larger than the over-all diameter of the cylindrical retaining member d, whereupon the latter may be inserted through said hole by hand until the assembly is arrested by the abutment of the external flange constituted by the terminal edges of the flared out portions 3 on the outer edge of hole 6, as shown in Figs. 2 and 3.

The bolt a is then passed successively through a hole 14 provided for this purpose in the part b to be secured on the wall e and then through the open outer end of the retaining member to be finally engaged in the nut.

For screwing the bolt into the nut, the operator exerts both an axial and turning stresses.

The axial component of these stresses presses the nut c on the bottom 1 of the retaining member d. As already mentioned above, in the example shown, this causes, first of all, an automatic centering of the nut, that greatly facilitates the engagement of the bolt in the nut.

Now, due on the one hand to the axial freedom of the nut in the retaining member that permits free orientation of the nut and, on the other hand, to the material difference between the diameter of the flange and that of the threading of the nut, the friction of the flange on the wall e suffices to prevent any rotation of the assembly in the hole 6. Upon further screwing of the bolt a in the nut c, as shown in Fig. 4, the chamfer 10 is brought into contact with the inner limiting line of the edges 9 of the lugs 4, and the head of the bolt a is brought into contact with the part to be secured.

As a result, upon further screwing, the said part is pressed upon the external flange, thus increasing the friction opposing rotation of the assembly. If screwing goes on, the said limiting line slides around the slope of the chamfer 10 so that the nut is forced between the lugs on which it exerts a wedging action deforming them outwardly. Since the periphery of the hole 6 opposes this deformation, the lugs 4 are strongly applied on said periphery, which ensures a crimping of the whole assembly at the wall e. The first phase of the deformation of the lugs 4 is shown in Figs. 4 and 5, while Figs. 6 and 7 show the final aspect of the various elements after home screwing of the bolt a in the nut c. During deformation of the lugs, the resistance of the same to said deformation is weaker than the progressively increasing friction of the assembly on the mounting wall e, so that also during this last phase of the operation, the nut-and-retainer assembly is efficiently prevented from turning in hole 6. It is to be noted that the pressure exerted by the operator on the part b and transmitted to the flange of the retaining member d also tends to hold the assembly against rotation.

In the modification shown in Figs. 8 and 9, the threaded member housed in the retaining member d is constituted by the head 14 of a bolt, the threaded shank 15 of which projects on the outer accessible side of the wall e through the hole 14 of the part b to receive a cooperating nut 16. In this case, as shown in Figs. 8 and 9, the bottom 1 is not necessarily provided with an aperture, such as 7 of Fig. 1, since no projecting part is to be accommodated through said bottom. However, it will be easily understood that standard retaining members such as d of Fig. 1 may be provided for receiving at will either a nut c or the head 14 of a bolt.

As shown in Fig. 10, a bolt-and-retainer assembly according to the invention may be used as a pipe-union to be rapidly secured on the wall 17 of a duct 18. For this purpose, it suffices to provide the bolt 14a with an axial bore 19 extending along its whole length to communicate the inside of the duct 18 with an external space. In this application, the assembly is preferably completed by packing means such as a deformable ring 20 associated with a metal washer 21 interposed between the wall 17 and the nut 16a cooperating with the threaded shank 15a of the bolt.

The external flange mentioned above and shown in Figs. 1 to 7 has a very small thickness, due to the fact that it is merely constituted by the outer edges of the flared out terminal portions 3. Nevertheless, in certain applications, the presence of this flange between the mounting wall and the part to be secured thereon may be objectionable. In this case, it is easy to countersink the said flange in the outer edge of the mounting hole, as shown in Figs. 8 to 10, said edge being for this purpose slightly chamfered as shown at 22.

In the case of Fig. 10, this arrangement is indispensable for obvious tightness considerations.

What is claimed is:

1. A nut assembly for use in connection with an apertured member, comprising an internally threaded nut body having a tapered end portion and two diametrally opposite longitudinal grooves, a cage member for said nut body consisting of an apertured base and two arms integral with and extending longitudinally from said base at two diametrally opposite points thereof and terminating each in a transverse head section of substantially semi-circular shape, the outer edge of which is bent to form a radial flange and the inner edge of which is slit to provide deformable head portions, said nut body being lodged within said cage member between said base and said inner edge of the head sections and with its grooves engaged by said arms so as to be guided thereby upon axial displacements of the nut body within said cage member, said tapered end portion of the nut body being designed to engage said deformable head portions to distort the same upon axial displacement of the nut body in a tightening direction, and said radial flange and said head portions of the cage member being designed to bear upon opposite surfaces of the apertured member as said head portions are distorted by said nut body.

2. An assembly for use in connection with an apertured wall comprising a cylindrical threaded member to be retained on said wall, in order to prepare attachment of a part to said wall under screwing interenagement and interaction between the said threaded member and another conjugated one and a tubular retaining member, the outer diameter of which is slightly smaller than the diameter of said aperture and at most equal to that of said threaded member, said retaining member having a flared out open-end portion to ensure abutment of said retaining member on one side of said wall and to permit said screwing interengagement and a bottom portion, two diametrically opposed longitudinal bracing strips to interconnect said bottom portion with said open-end portion, and a plurality of longitudinally deformable lugs extending from said flared out open-end portion towards said bottom portion along a length materially greater than the thickness of said wall and having their inner edge spaced from said bottom portion by a distance materially greater than the axial length of said threaded member, the latter being provided with two diametrically opposed outer longitudinal grooves engageable by said strips with a free sliding fit, both outer edges of said threaded member being chamfered symmetrically with respect to the mid-section plane of said threaded member to be forcedly engaged between said lugs for flaring the same out as said screwing interaction is exerted to thereby clamp said wall between themselves and said retaining member flared out open-end portion, and said bottom portion being frusto-conical whereby said threaded member is automatically centered as it is pressed upon said bottom portion upon said screwing interengagement.

3. An assembly for use in connection with an apertured wall comprising a cylindrical threaded member to be retained on said wall, in order to prepare attachment of a part to said wall under screwing interengagement and interaction between the said threaded member and another conjugated one and a tubular retaining member, the outer diameter of which is slightly smaller than the diameter of said aperture and at most equal to that of said threaded member, said retaining member having a flared out open-end portion to ensure abutment of said retaining member on one side of said wall and to permit said screwing interengagement and a bottom portion, two diametrically opposed longitudinal bracing strips to interconnect said bottom portion with said open-end portion, said retaining member being diametrically slotted along its whole length except for said bottom portion, and a plurality of longitudinal deformable lugs extending from said flared out open-end portion towards said bottom portion along a length materially greater than the thickness of said wall and having their inner edge spaced from said bottom portion by a distance materially greater than the axial length of said threaded member, the latter being provided with two diametrically opposed outer longitudinal grooves engageable by said strips with a free sliding fit, and at least that external edge of said threaded member which faces said lugs being chamfered to be forcedly engaged between said lugs for flaring the same out as said screwing interaction is exerted to thereby clamp said wall between themselves and said retaining member flared out open-end portion.

4. An assembly for use in connection with an apertured wall comprising a nut to be retained on said wall, in order to prepare attachment of a part to said wall under screwing interengagement and interaction between the said nut and a threaded shank of a conjugated bolt and a tubular retaining member, the outer diameter of which is slightly smaller than the diameter of said aperture and at most equal to that of said nut, said retaining member having a flared out open-end portion to ensure abutment of said retaining member on one side of said wall and to permit said screwing interengagement and a bottom portion, two diametrically opposed longitudinal bracing strips to interconnect said bottom portion with said open-end portion, and a plurality of longitudinal deformable lugs extending from said flared out open-end portion towards said bottom portion along a length materially greater than the thickness of said wall and having their inner edge spaced from said bottom portion by a distance materially greater than the axial length of said nut, the nut being provided with an inner threading having a diameter materially smaller than that of said retaining member flared out portion, the nut being provided with two diametrically opposed outer longitudinal grooves engageable by said strips with a free sliding fit, and at least that external edge of said nut which faces said lugs being chamfered to be forcedly engaged between said lugs for flaring the same out as said screwing interaction is exerted to thereby clamp said wall between themselves and said retaining member flared out open-end portion, and said bottom portion being apertured to accommodate the threaded shank of the conjugated bolt when the same is screwed through the nut.

5. An assembly for use in connection with an apertured wall comprising a headed bolt having a threaded shank to be retained on said wall, in order to prepare attachment of a part to said wall under screwing interengagement and interaction between said bolt and a conjugated nut and a tubular retaining member, the outer diameter of which is slightly smaller than the diameter of said aperture and at most equal to that of the head of the bolt, said retaining member having a flared out open-end portion to ensure abutment of said retaining member on one side of said wall and to permit said screwing interengagement and a bottom portion, two diametrically opposed longitudinal bracing strips to interconnect said bottom portion with said open-end portion, and a plurality of longitudinal deformable lugs extending from said flared out open-end portion towards said bottom portion along a length materially greater than the thickness of said wall and having their inner edge spaced from said bottom portion by a distance materially greater than the axial length of said bolt head, the latter being provided with two diametrically opposed outer longitudinal grooves engageable by said strips with a free sliding fit and at least that external edge of the bolt head which faces said lugs being chamfered to be forcedly engaged between said lugs for flaring the same out as said screwing interaction is exerted to thereby clamp said wall between themselves and said retaining member flared out open-end portion, the threaded shank of the bolt projecting through the wall aperture to receive said conjugated nut and the bolt being provided with an axial bore extending along its whole length to communicate with both sides of said wall.

6. An assembly as claimed in claim 5 further comprising packing means interposed between said wall and said conjugated nut.

References Cited in the file of this patent
UNITED STATES PATENTS

| | | |
|---|---|---|
| 1,650,958 | Ogden et al. | Nov. 29, 1927 |
| 1,711,453 | Carr | Apr. 30, 1929 |
| 2,381,113 | Cook | Aug. 7, 1945 |
| 2,398,041 | Russel | Apr. 9, 1946 |
| 2,516,554 | Coyne | July 25, 1950 |
| 2,667,099 | Lewis | Jan. 26, 1954 |